W. A. HORRALL.
Whiffletree.
No. 57,820.
Patented Sept. 4, 1866.
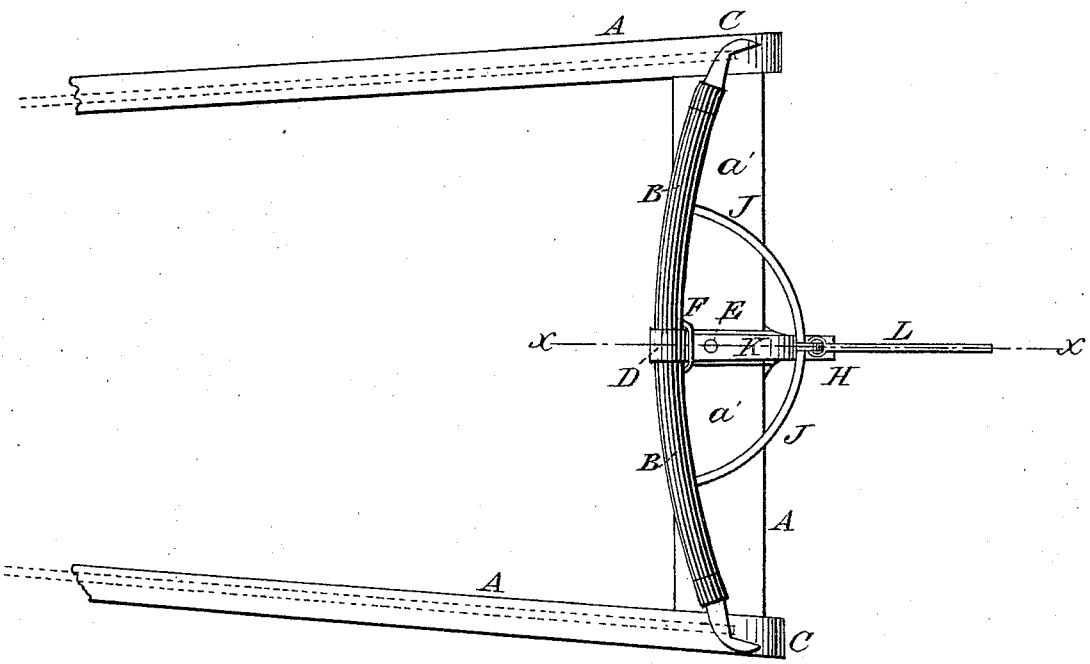
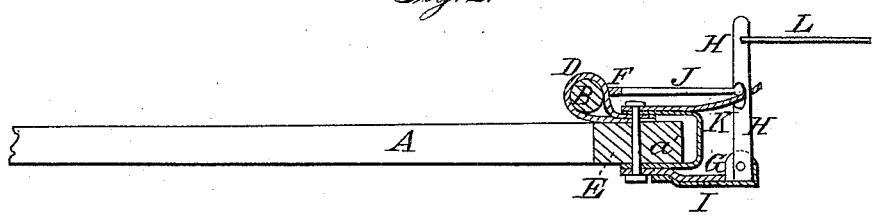
Witnesses:
Inventor:

UNITED STATES PATENT OFFICE.

W. A. HORRALL, OF WASHINGTON, INDIANA, ASSIGNOR TO HIMSELF AND McCRELLIS GRAY, OF SAME PLACE.

IMPROVEMENT IN WHIFFLETREES.

Specification forming part of Letters Patent No. 57,820, dated September 4, 1866.

*To all whom it may concern:*

Be it known that I, W. A. HORRALL, of Washington, Davis county, and State of Indiana, have invented a new and useful Improvement in Safety-Whiffletrees; and I do hereby declare that the following is a full, clear, and exact description thereof, which will enable others skilled in the art to make and use the same, reference being had to the accompanying drawings, forming part of this specification, in which—

Figure 1 is a top view of a portion of a pair of thills with my improved whiffletree attached. Fig. 2 is a vertical section of the same, taken through the line $x\ x$, Fig. 1.

Similar letters of reference indicate like parts.

My invention has for its object to furnish an improved whiffletree by means of which the horse may be released from the carriage whenever he becomes so unmanageable as to render it advisable; and it consists of the combination and arrangement of the whiffletree, band, bar, lever, arm, and springs, as hereinafter more fully described.

A are the thills. B is the whiffletree, which is curved as shown in Fig. 1, and to its ends are attached the hooks C. These hooks C are so made, as shown in Fig. 1, that when the whiffletree is in the position shown the traces will be held securely in place, but when the whiffletree is allowed to turn over the traces will readily slip from the said hooks and allow the horse to become free from the carriage.

The whiffletree B is secured to the cross-bar $a'$ of the thills by a band D, which passes around its central part, and is secured to the said cross-bar by a bolt, E, which passes through the ends of the said band or strap D, and through said cross-bar $a'$, as shown in Figs. 1 and 2.

The whiffletree is kept in its proper position by the staple F, which passes around the band D, and is driven into the whiffletree, as shown. This allows the whiffletree to turn freely within the band D, but keeps it from slipping longitudinally therein.

To the under side of the cross-bar $a'$ is attached an arm, G, which projects in the rear of said cross-bar, and has ears formed upon its end, to which is pivoted the upright lever H.

I is a spring, one end of which is attached to the arm G, and the other presses against the lower end of the lever H, holding it in a vertical position.

J is a bent bar, the ends of which are attached to the whiffletree B, and which enters and works in a notch formed in the front edge of the upright lever H. The bow or bend of the bar J is such that, however the whiffletree may be turned about the bolt E, the bar J may still be in the notch of the lever H.

K is a spring, one end of which is secured to the cross-bar $a'$ by the bolt E, and the other end is notched to receive the lever H. This spring is of such a length as to extend beyond the bar J, as shown, so as always to be beneath the said bar. The elasticity of the spring K keeps the bent bar J in the notch of the lever H, and when the lever H is drawn back it throws up the said bar J, revolving the whiffletree and allowing the traces to slip from the hooks C, freeing the horse from the carriage.

L is a wire or cord, one end of which is attached to the upper end of the lever H, and the other end passes back, and is secured to the carriage in such a position as to be easily detached by the driver whenever the horse becomes unmanageable and it is desired to free him from the carriage.

I claim as new and desire to secure by Letters Patent—

The combination of the lever H, spring I, arm G, spring K, bar J, band D, and whiffletree B with each other and with the cross-bar $a'$ of the thills, when said parts are constructed and arranged substantially as herein described, and for the purpose set forth.

W. A. HORRALL.

Witnesses:
GEORGE W. GLOVER,
JOHN HYATT.